Nov. 30, 1954     S. E. GATTUSO     2,695,744
DOUBLE-WALLED CONTAINER
Filed Sept. 23, 1952
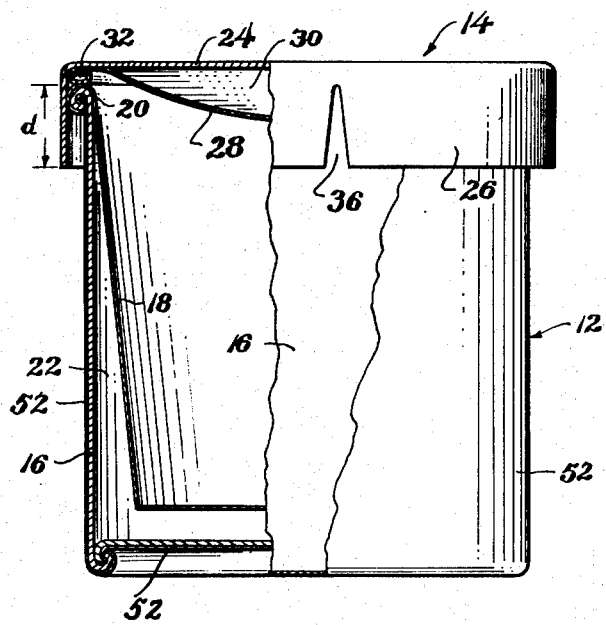
Fig. ~1~
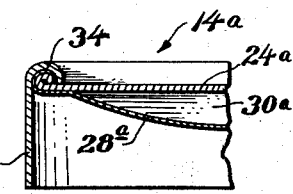
Fig. ~2~
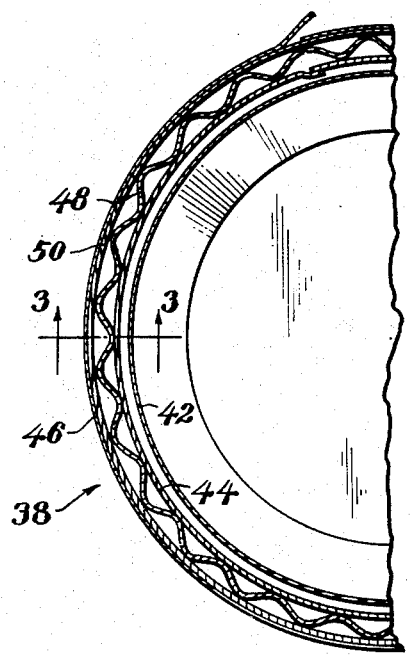
Fig. ~4~
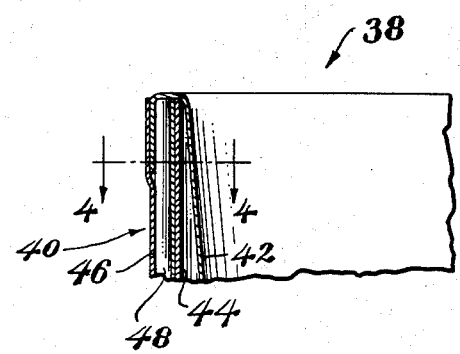
Fig. ~3~
INVENTOR.
SALVATORE E. GATTUSO
BY
ATTORNEY

United States Patent Office 2,695,744
Patented Nov. 30, 1954

2,695,744

DOUBLE-WALLED CONTAINER

Salvatore E. Gattuso, Ozone Park, N. Y., assignor of eight per cent to Anthony Capizzi and eight per cent to Peter Capizzi, both of Brooklyn, eight per cent to Andrew J. Pantano, Franklin Square, and twenty-five per cent to Joseph Radosti, Corona, N. Y.

Application September 23, 1952, Serial No. 311,118

2 Claims. (Cl. 229—14)

The present invention relates generally to containers, and is particularly directed to a disposable and covered, double-walled container adapted for carrying and serving heated liquids or comestibles, for example, hot beverages or soups.

Heretofore, covered containers provided for carrying and serving heated liquids or comestibles have been formed of heavy paper or cardboard. Such covered containers have many disadvantages in that an objectionable "cardboard" taste or flavor is imparted to the contents, and further, the heated contents soften the cardboard structure so that the latter has a tendency to develop leaks. The existing disposable and covered containers also transmit the heat from the contents through the walls of the containers so that the latter become uncomfortable to the touch and can be held only with difficulty, and so that the contents cool relatively quickly. Finally, the disposable and covered containers which are widely used at present have a cover formed with a marginal flange to engage over the top of the container body and the cover is formed with a central vent opening to permit the escape and entrance of air during the placement and removal of the cover, respectively. However, this central vent opening is always open so that the heat of the contents escapes therethrough and the liquid contents may leak through the vent opening when the container is inverted.

Accordingly, it is an object of the present invention to provide a disposable, covered container adapted for carrying and serving heated liquids or comestibles which does not impart any undesirable or unpleasant taste or flavor to the contents and which is effective to insulate the contents so that the latter retains its heat and the container may be comfortably held.

Another object is to provide a container of the described character formed with a liner which is impervious to any heated liquids or comestibles that may be placed therein so that the container will continue to be fluid tight even after such heated liquids or comestibles have been stored therein for a considerable length of time.

Still another object is to provide a covered container of the described character which is constructed with a vent arrangement permitting the placement and removal of the cover while the vent is completely sealed off when the cover is in its fully closed position so that the container is then sealed to prevent the escape of vapor or liquid.

A further object of the present invention is to provide a covered container having the above mentioned characteristics and which is simple and inexpensive to produce so that it may be disposable without great cost. Finally, it is an object to provide a disposable, covered container which is sturdy to withstand rough or careless handling without losing its fluid-tightness, and which may be placed over an open fire for heating the contents.

In accordance with the present invention, the above, and other objects, features and advantages which will be apparent in the following detailed description, are achieved by providing a container which includes a container body and a cover having a marginal flange to fit over the upper portion of the body. The container body includes an outer casing, which may be formed of cardboard, for example, corrugated cardboard, and an inner liner which is formed of metal foil and is spaced from the outer casing to provide an insulating air space around the sides and bottom of the liner. The cover is also provided with a metal foil liner which is spaced from the cover, at least in the center, to provide an insulating air space. The metal foil liners of both the container body and the cover are arranged to come into sealing engagement at the upper edge of the container body when the cover is in its fully closed position. The marginal flange of the cover is formed with one or more notches opening downwardly to act as vents during the movement of the flange upwardly and downwardly on the upper portion of the container body and to be completely closed by the latter when the metal foil liners of the body and cover come into sealing engagement.

In order to facilitate understanding of the present invention, illustrative embodiments thereof are described in detail hereinafter and shown in the accompanying drawing forming a part hereof and wherein:

Fig. 1 is an elevational view, partly broken away and in section, of a covered container embodying the present invention;

Fig. 2 is a fragmentary sectional view of a cover for a container constructed in accordance with another embodiment of the invention;

Fig. 3 is a fragmentary sectional view, taken along the line 3—3 of Fig. 4, and showing the constructional features of the upper portion of a container body according to still another embodiment of the present invention; and Fig. 4 is a horizontal sectional view of the container body taken along the line 4—4 of Fig. 3 and with an outer layer loosened at one end edge to show the method of assembly of the container body.

Referring to the drawing in detail, and initially to Fig. 1, a container embodying the present invention is there illustrated and indicated generally by the reference numeral 10. The container 10 comprises a container body 12 and a cover 14. The body 12 includes an outer casing 16 which may be cylindrical and is open at the top thereof. The outer casing 16 is preferably formed of cardboard or stiff paper, although any other suitably inexpensive and easily formed material may be employed therefor, and the side wall of the outer casing may be united with the bottom of the latter by a rolled joint of the kind conventionally employed in cardboard containers and shown in Fig. 1.

In accordance with the present invention, the container body 12 also includes a liner 18 which is formed of a metal foil and is joined to the upper edge of the outer casing 16 by a rolled joint, as at 20. The sides of the metal foil liner 18 taper downwardly and the height thereof is less than that of the outer casing so that the liner is spaced from the outer casing both at the sides and bottom to provide an insulating air space 22 therebetween.

The cover 14 includes a top part 24, which may be circular, and a marginal flange 26 depending from the periphery of the top part 24 to telescope over the upper portion of the container body 12 and to frictionally engage the latter for holding the cover in place on the container body. The cover 14 further includes a liner 28 formed of metal foil and having a downwardly dished configuration to stand away from the top part 24, at least at the center of the latter, and thereby define an insulating air space 30 therebetween. The cover liner 28 may be provided with a rolled peripheral edge, as at 32, and adhesively secured to the top part 24 at that edge so that, as the cover is placed on the container body and pressed downwardly over the upper part of the latter, the rolled edge 32 is compressed between the top part 24 and the rolled upper edge of the united outer casing 16 and liner 18 to afford a tight seal between the contacting surfaces of the cover and container body liners 28 and 18, respectively.

In an alternative form of construction, illustrated in Fig. 2, the cover 14a includes a top part 24a, a peripheral flange 26a and a metal foil liner 28a which is downwardly dished at the center to define an insulating air space 30a. However, the top part 24a and the flange 26a are formed as separate parts which are united by a suitable roller joint, as at 34, with the periphery of the liner 28a being included in the rolled joint 34 for attachment to the other parts of the cover. While the compressible metal foil roll 32 of the embodiment shown in Fig. 1 is sacrificed in the embodiment of Fig. 2, it is to be understood that the portion of the cover liner 28a adjacent the flange 26a engages the upper edge of the container body liner, which may be constructed in the manner indicated in Fig. 1, when the cover 14a is in its fully closed position on an associated container body.

Referring again to Fig. 1, it will be seen that the flange 26 of the container cover 14 is formed with at least one downwardly opening notch 36. The notch 36 has a vertical length which is only slightly smaller than the distance d by which the flange overlies the upper portion of the container body when the cover is in its fully closed position. Therefore, when the compressible roll 32 of the cover engages the rolled upper edge 20 of the container body, the notch 36 is completely closed by the container body, insofar as communication of the interior of the container with the atmosphere is concerned, and the notch 36 is opened, more or less, during the movement of the cover to and from its fully closed position to vent the interior of the container so that neither pressure nor suction will be developed to hinder such movements. Thus, with the cover in its fully closed position, the container is completely sealed and there is no danger of leaking or of the rapid cooling of the contents by reason of the escape of heated vapors, while the venting notches 36 ensure that the cover may be easily placed on, or removed from, the container body. In order to make certain that the venting action of the notches 36 is achieved even when the cover is canted to one side or the other during its movement, at least two notches of the kind illustrated at 36 are preferably provided at diametrically opposed locations on the flange 26. Thus, at least one of the notches will be more or less open during the movement of the cover.

Referring now to Figs. 3 and 4 of the drawing, a container body constructed in accordance with another embodiment of the present invention is there illustrated and generally identified by the reference numeral 38. The container body 38 may have a cover associated therewith (not shown) which is constructed in the manner illustrated in either Fig. 1 or in Fig. 2. The container body 38 may be of cylindrical or other configuration and includes an outer casing 40 and an inner liner 42 formed of a metal foil. The inner liner 42, as in the previously described embodiment, is spaced from the outer casing 40 at the sides and the bottom to define an insulating air space therebetween. The embodiment of Figs. 3 and 4 is distinguished from that previously described in that the outer casing 40 is formed of corrugated paper or board to provide relatively great strength and resistance to rough handling which might otherwise cause leakage of the contents. The corrugated cardboard forming the outer casing 40 includes a flat inner layer 44, a flat outer layer 46 and an undulating layer 48 interposed between the layers 44 and 46, with the undulations extending vertically, and adhesively secured to the latter layers. In order to permit the formation of a cylindrical container body having a relatively small diameter, the undulating layer 48 and the inner layer 44 are first formed into the desired cylindrical shape, and then the outer layer 46 is wrapped around the undulating layer 48, as shown in Fig. 3, and adhesively secured to the layer 48.

The metal foil liner 42 at its upper edge portion is bent outwardly and then downwardly, as at 50, to be secured between the outer layer 46 and the undulating layer 48, as shown in Fig. 4. Thus, the foil metal liner 42 is secured at the top to the outer casing 40 to seal the insulating air space therebetween. Further, by forming the layers 44 and 48 of the corrugated cardboard to the desired shape before attaching the outer layer 46 thereto, the latter acts to secure the liner 42 to the outer casing 40 and the outer casing may be formed with a relatively small radius of curvature.

Referring again to Fig. 1, it will be seen that an outer layer 52 of metal foil may cover the container body 12 so that the latter may be placed over an open fire for heating the contents thereof without the danger of destroying the cardboard outer casing 16.

From the foregoing description of illustrative embodiments of the invention, it is apparent that covered containers have been provided for carrying and serving heated liquids or comestibles wherein the foil metal liner is not affected by the heated contents and does not impart any undesirable or unpleasant taste to the latter. Further, the insulating air spaces provided between the liner and outer casing at the sides, top and bottom of the container are effective to prevent rapid loss of heat from the contents so that the contents remain hot and the container may be comfortably held. Further, since the foil metal liner is impervious to the heated liquids or comestibles which are intended to be placed therein, the container will continue to be fluid-tight even after such heated liquids or comestibles have been stored therein for a considerable length of time. It is also apparent that the covers of the described containers are constructed in a manner to vent the interior of the container to the atmosphere only when the cover is being moved from and to its fully closed position on the container body, and that, when the cover is in its fully closed position, the interior of the container is effectively sealed. Finally, it is apparent that the described containers, being of a double-walled construction, are capable of resisting rough or careless handling without developing leaks, and this characteristic is particularly apparent in the embodiment wherein the outer casing is formed of corrugated cardboard.

It should also be noted that, although the outer layer of metal foil permits the container to be placed over an open fire for heating the contents, this outer layer cools quickly upon removal from the fire to permit handling of the container.

While I have described and illustrated several precise embodiments of the invention, it is to be understood that the invention is not limited to these specific illustrations, and that various changes and modifications may be effected therein without departing from the scope or spirit of the invention as defined in the appended claims.

What I claim is:

1. A container comprising a container body including an upwardly opening outer casing and an upwardly opening foil metal liner fitting in said casing and engaging the latter at its upper edge, said foil metal liner being spaced inwardly from said casing at the sides and bottom thereof to define an insulating air space between said liner and casing; and a flanged container cover formed to telescope over and close the upper end of said container body and having a foil metal liner spaced therefrom at least in its central portion to define an air insulating space between said cover and the related liner, said foil metal liner of the cover having a rolled periphery inside the cover flange which registers with said upper edge of the container body liner when said cover closes the container body and is held in a compressed state between said cover and container body by frictional engagement of the cover flange with the upper portion of said casing.

2. A container according to claim 1; wherein said cover flange has at least one venting notch opening at the lower edge thereof, said venting notch having a length only slightly smaller than the distance said flange overlies said container body when said cover is seated on the latter so that said notch is effective to communicate the interior of the container with the atmosphere during substantially all the movement of said cover to and from its seat on the container body and so that said container body closes said notch with respect to the interior of the container body when said cover is seated on said container body.

References Cited in the file of this patent

UNITED STATES PATENTS

| Number | Name | Date |
|---|---|---|
| 1,180,188 | Retzbach | Apr. 18, 1916 |
| 1,208,483 | Chesbrough | Dec. 12, 1916 |
| 1,608,543 | Woodbridge | Nov. 30, 1926 |
| 1,955,745 | Hurley | Apr. 24, 1934 |
| 2,138,401 | Gazette | Nov. 29, 1938 |
| 2,144,273 | Raymond | Jan. 17, 1939 |
| 2,563,352 | Morse | Aug. 7, 1951 |